June 27, 1961  T. J. McMAHON  2,989,811
EDUCATION DEVICE FOR TEACHING DECIMALS AND FRACTIONS
Filed July 1, 1960  3 Sheets-Sheet 1
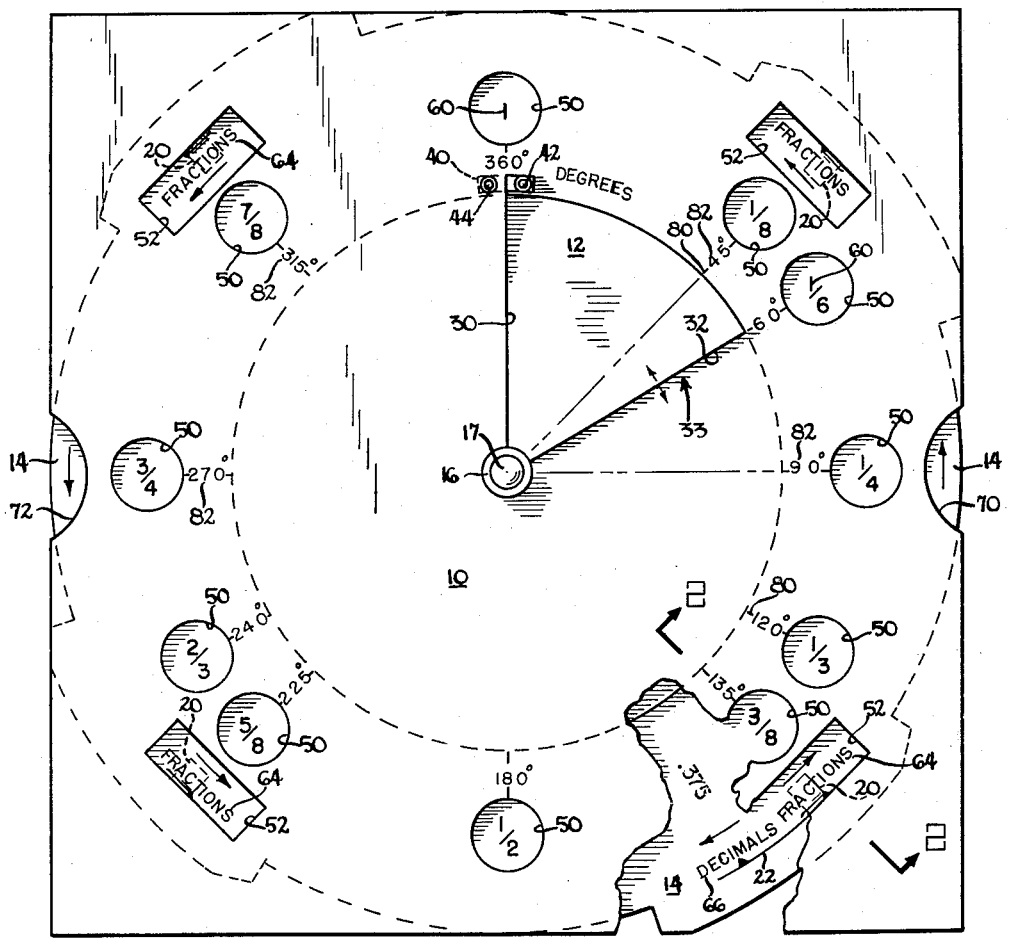
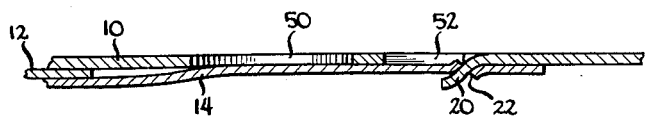
INVENTOR.
THOMAS J. McMAHON
BY Kenwood Ross
ATTORNEY June 27, 1961  T. J. McMAHON  2,989,811
EDUCATION DEVICE FOR TEACHING DECIMALS AND FRACTIONS
Filed July 1, 1960  3 Sheets-Sheet 2

*INVENTOR.*
THOMAS J. McMAHON
BY Kenwood Ross
ATTORNEY

June 27, 1961 T. J. McMAHON 2,989,811
EDUCATION DEVICE FOR TEACHING DECIMALS AND FRACTIONS
Filed July 1, 1960 3 Sheets-Sheet 3

INVENTOR.
THOMAS J. McMAHON
BY Kenwood Ross
ATTORNEY

United States Patent Office 2,989,811
Patented June 27, 1961

2,989,811
EDUCATION DEVICE FOR TEACHING DECIMALS AND FRACTIONS
Thomas J. McMahon, Glendale, Calif., assignor to Milton Bradley Company, Springfield, Mass., a corporation
Filed July 1, 1960, Ser. No. 40,428
2 Claims. (Cl. 35—74)

The present invention relates to new and useful improvements in a device for teaching fractional and decimal arithmetic in a simple and appealing manner.

It is a principal object hereof to provide a training aid whereby the relationship between various fractions and decimals can be readily demonstrated, the components of the device being readily shiftable for purposes of permitting the ready identification of particular fractions or decimals which it is desired to teach.

It is another object hereof to provide a training device which may be readily used to demonstrate fractional arithmetic and decimal arithmetic, and also the plane geometry of circles and their sectors, which training device is durable, simple in construction, economical in manufacture, and highly efficient and serviceable in use.

Many children find it exceedingly difficult to acquire abstract knowledge. In the simple exercises in arithmetic, for instance, there is the omnipresent problem of making same attractive to a child and making same conducive to concentration.

Accordingly, it is a salient object of my invention to associate mathematical problems with some interesting and appropriate pictorial matter, so that the student's mind will be alert and eager and so that the student will give the project his wholehearted and spontaneous cooperation.

As a further refinement, I provide an attractive self-instruction device by means of which the student may instruct himself with the usual danger of error incident to self-instruction eliminated.

It is another object to provide a cheap, durable device which occupies little space and one wherein the parts of same will not become easily separated and lost.

For further comprehension of the invention and of the objects and advantages thereof, reference will be had to the following description and the accompanying drawings wherein:

FIG. 1 is a top plan view of a preferred form of the device comprising the present invention;

FIG. 2 is a sectional view on the line 2—2 of FIG. 1;

Figure 3:
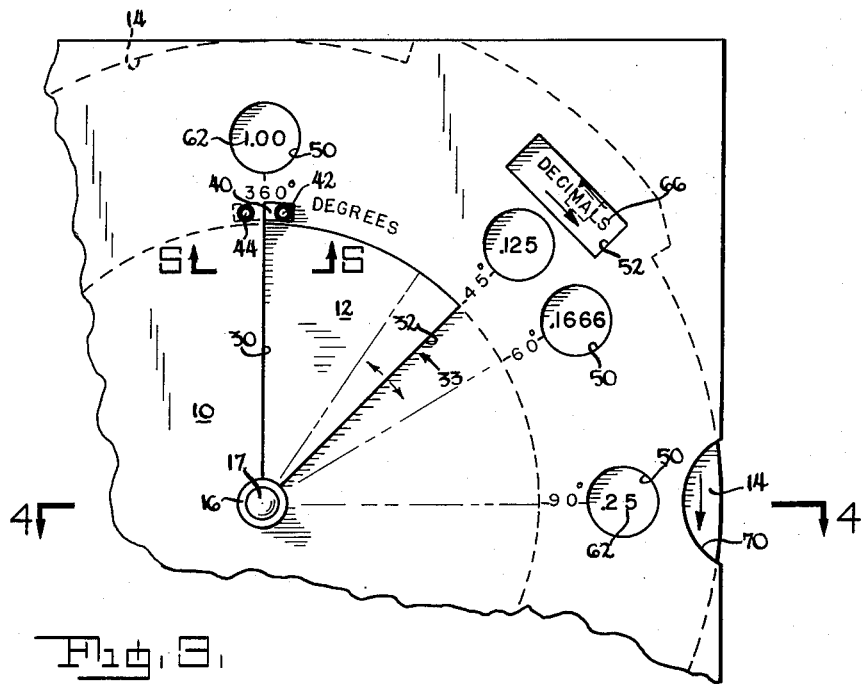
FIG. 3 is a fragmentary top plan view of the device shown in FIG. 1 in an adjusted position.
Figure 4:
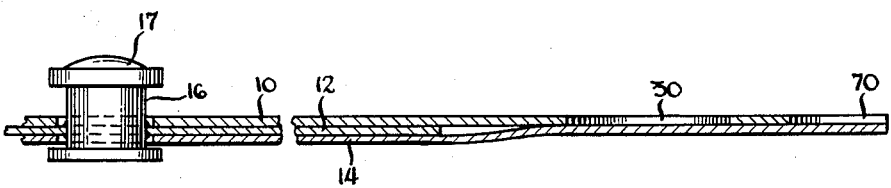
FIG. 4 is a sectional view on the line 4—4 of FIG. 3.
Figure 5:
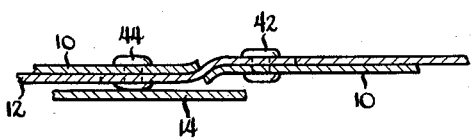
FIG. 5 is a sectional view on the line 5—5 of FIG. 3.
Figure 6:
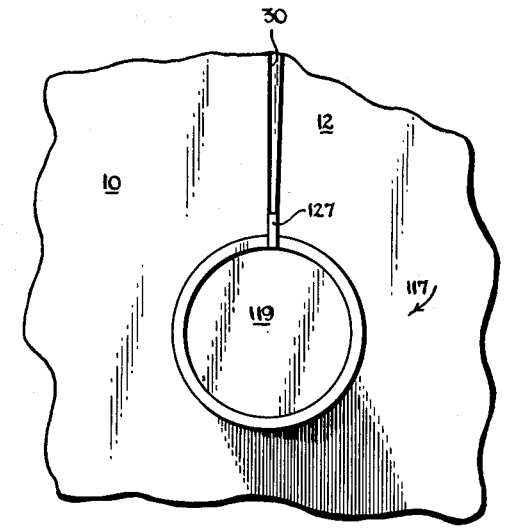
FIG. 6 is a partial top plan view of a modified rotative means whereby the primary disc may be rotated relative to the front panel means of the invention.

With continued reference to the drawings wherein, for the purpose of illustration, like numerals designate like parts throughout the same, the calculator device hereof includes a front panel 10, a primary disc 12, a secondary disc 14, and a ring rivet 16 having a manually engageable forwardly extending portion 17.

The front panel 10 is preferably made from a single sheet of cardboard, thermoplastic, plastic, sheet metal or other similar material.

Primary disc 12 is centrally and rotatably secured to the front panel adjacent to and rearwardly thereof as by the rivet 16. Secondary disc 14 is of greater diameter than primary disc 12 and is also centrally and rotatably secured to the front panel and rearwardly thereof and adjacent the primary disc 12 by said rivet 16.

Primary and secondary discs 12 and 14 are preferably made from a single sheet of carboard, thermoplastic, plastic, sheet metal or equivalent material.

The outer periphery of secondary disc 14 may be movably engaged with front panel 10 by means of depressible tab or tongue portions 20 which may be provided in front panel 10 and may have free outer ends which may be depressed and inserted into and through suitably located complemental arcuate slots 22 provided adjacent the peripheral edge of secondary disc 14. Said slots 22 are of such length as to permit the shifting rotation of secondary disc 14 relative to front panel 10 between two positions, identified as a primary position and a secondary position, for purposes presently to be observed, and to limit the rotative movement of the said secondary disc to between said positions. See FIG. 2.

Front panel 10 is provided with a slot 30 extending therethrough along a portion of a radius from the center of the panel adjacent rivet 16 through a length slightly in excess of the dimension of the radius of primary disc 12.

Primary disc 12 is also provided with a slot 32 extending therethrough along a radius from the center of the disc adjacent rivet 16.

Front panel 10 may be provided with a spacer 40 which is fixed to the forward face of the panel as by a rivet 42 at one side of the outer extremity of slot 30 and which is fixed to the rearward face of the panel as by a rivet 44 at the opposite side of the outer extremity of slot 30, said spacer 40 being of such thickness as to provide an enlarged opening at the slot by virtue of the disposition of the horizontal plane of front panel 10 at one side of slot 30 forwardly of or outwardly of the horizontal plane of front panel 10 at the other side of slot 30.

Primary disc 12 may be rotated relative to front panel 10 by means of manual engagement of portion 17 of the ring rivet.

The leading edge 33 of slot 32 of primary disc 12 is thus introduced through slot 30 of front panel 10 so that primary disc 12, or at least a portion thereof, may be rotated so as to overlie the forward face of front panel 10, in manner as will presently be observed.

As primary disc 12 is rotated in a clockwise direction, following the introduction of the said leading edge 33 of the slotted primary disc through slot 30 of the front panel, the primary disc is actuated so as to overlie a portion of the forward face of front panel 10 in any desired degree or to any desired extent, according to the training purpose.

Continued rotation of primary disc 12 in the clockwise direction will result in the entirety of primary disc 12 being disposed forwardly of front panel 10.

Continued rotation of primary disc 12 in a counter-clockwise direction will result in the positioning of the primary disc behind the front panel.

Front panel 10 is provided with a plurality of openings 50 therethrough which are arranged in an annular ring around rivet 16 and another plurality of openings 52 therethrough which are arranged in a secondary annular ring around rivet 16 and outside of the ring of openings 50, all in manner to overlie secondary disc 14.

Openings 50 and 52 are adapted to expose or to cover respective series of indicia.

An annular ring of indicia 60, representative of the fractions such as "⅛," "⅙," "¼," "⅓," "⅜," "½," etc., is delineated in seriatim upon the upper face of secondary disc 14 in manner so as to register with openings 50 in the primary or "fraction" position of the secondary disc relative to the front panel, as shown in FIG. 1.

Another series of indicia 62, representative of the decimal equivalents of the said delineated fractions such as ".125," ".1666," ".25," etc., is dilineated in seriatim upon the upper face of secondary disc 14 in the annular ring defined by indicia 60 in manner to alternate therewith so as to register with openings 50 in the secondary or "decimal" position of the secondary disc relative to the front panel, as shown in FIG. 3.

An annular ring of indicia 64, delineating the word "Fractions," is impressed upon the upper face of secondary disc 14 in manner to register with openings 52 in the said primary or "fraction" position of the secondary disc relative to the front panel, as shown in FIG. 1.

Annular ring of indicia 66, delineating the word "Decimals," is impressed upon the upper face of secondary disc 14 in manner to register with openings 52 in the said secondary or "decimals" position of the secondary disc relative to the front panel, as shown in FIG. 3.

Additionally, front panel is provided with a recessed portion 70 at one peripheral edge and a similar recessed portion 72 at the opposite peripheral edge to expose the periphery of secondary disc 14 for the rotation thereof relative to front panel 10.

As secondary disc 14 is rotated by engagement of the peripheral edge portion thereof extending through recess 70 or recess 72 in the front panel, it may be moved between a primary or "fraction" position where the delineated fractions 60 appear through front panel openings 50 and the delineated words "Fractions" 64 appear through front panel openings 52, and a secondary or "decimal" position where the delineated decimals 62 appear through front panel openings 50 and the delineated words "Decimals" 66 appear through front panel openings 52.

To aid in operation of the device, primary disc 12 may be rotated to permit its said leading edge 33 to be stopped adjacent a tick mark 80 centrally opposite one of the openings 50.

If desired, primary disc 12 may be of a contrasting color so as to more dramatically illustrate the representation.

By inspection, when the leading edge of primary disc 12 is brought to tick mark 80 opposite opening 50 representative of the fraction "¼" or the decimal ".250," for example, the student will see that the sector of the primary disc 12 disposed forwardly of front panel 10 and therefore visible is one-fourth of the entire primary panel.

Preferentially, adjacent the tick marks 80, indicia 82 may be imposed delineating the correct angle in degrees, as for example "45°" at the window representative of the fraction "¼" or the decimal ".250."

The various combinations in which the several sets of information may be used coincidentally will be readily perceived by the reader, it being appreciated that fractions or percentages, decimal arithmetic, and the plane geometry of circles may be demonstrated through the use of the apparatus herein disclosed.

In FIGS. 6-9 inclusive, I have shown a modified interlocking rotative means generally designated by the numeral 117 comprised of a manually engageable knob member 119, and a base member 121.

Figures 7, 8:
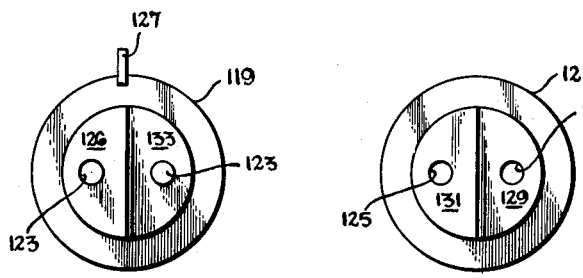
FIGS. 7 and 8 are top plan views of the two segments of the rotative means shown in FIG. 6.
Figure 9:
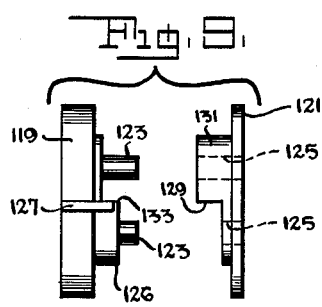
FIG. 9 is an exploded view showing the relative positions of the segments of FIGS. 7 and 8 immediately prior to assembly thereof.

The knob member 119 is preferably annular in shape and is provided with a pair of transversely extending pins 123, said pins being fixed to the rearward face thereof and extending outwardly therefrom, as indicated in FIGS. 7 and 9.

Base member 121, which is also preferably annular in shape, is suitably perforated as at 125 to receive the transverse pins 123 of knob 119.

A stop member 127 is fixed to the outer periphery of knob 119 and extends outwardly therefrom. Upon counter-clockwise rotation of the knob 119, when the inner vertical edge of said stop member contacts the vertical edge of slot 30, further rotation of the primary disc is prevented.

The rearward face of knob 119 may be interlocked with the forward face of base member 121 upon insertion of the pins 123 of the knob into the perforations 125 of the base.

Continued inward pressure upon each of the members 119 and 121 causes the laterally outwardly extending protrusion 126 of the knob 119 to interlock with a corresponding detent 129 in the face of the base 121, while a protrusion 131 extending laterally outwardly from the face of the base 125 simultaneously interlocks with a corresponding detent 133 in the rearward surface of the knob 119.

It will be understood that the protrusions extending laterally outwardly from the knob 119 and the base 121 are each circumferential in shape and are each of a smaller diameter than the diameters of said knob and base.

It is contemplated that the front panel 10, primary disc 12 and secondary disc 14 of the invention will be suitably perforated to receive the pins 123 of the knob 117.

While I have illustrated and described the preferred embodiments of my invention, it is to be understood that I do not limit myself to the precise constructions herein disclosed and the right is reserved to all changes and modifications coming within the scope of the invention as defined in the appended claims.

What I claim is:

1. In an educational device for graphically portraying the relationship between fractions or percentages, decimal arithmetic, and the plane geometry of circles, comprising, a front panel, a primary disc, a secondary disc, means connecting said discs to said panel centrally thereof in manner to permit rotative movement of said discs relative to said front panel, said front panel having a first series of circumferentially disposed apertures provided therein adjacent the peripheral edges thereof and having a second series of circumferentially disposed apertures provided therein adjacent said first series of apertures, said secondary disc having a first annular ring of indicia representative of fractions and their decimal equivalents delineated in seriatim on the face thereof and visible through the first series of apertures in said front panel and having a second annular ring of indicia delineated thereon adjacent said first ring and visible through the second series of apertures in said front panel, said secondary disc being movable for moving the indicia into and out of coincidence with said apertures, said front panel and said primary disc being radially slotted whereby a portion of said primary disc may be rotated from a position rearwardly of said front panel to a superposed exposed position forwardly of said front panel whereby the relationship between the plane geometry of the arc depicted by the sectoral exposed portion of said primary disc may be related to the correlative fractional or decimal equivalents delineated on said secondary disc and visible through the circumferentially disposed apertures in said front panel.

2. In an educational device as set forth in claim 1, wherein certain of said first and second series of indicia delineated on said secondary disc is visible through said first and second series of apertures in said front panel as said secondary disc is moved to a relative primary position, and the other indicia of said first and second series is visible through said apertures upon movement of said secondary disc to a relative secondary position.

References Cited in the file of this patent

UNITED STATES PATENTS

| | | |
|---|---|---|
| 1,539,868 | Roberts | June 2, 1925 |
| 1,836,643 | Chesham | Dec. 15, 1931 |
| 2,385,732 | Redding | Sept. 25, 1945 |
| 2,560,647 | Higgins | July 17, 1951 |

FOREIGN PATENTS

| | | |
|---|---|---|
| 15,279 | Great Britain | Oct. 24, 1888 |